(12) United States Patent
Imanishi et al.

(10) Patent No.: US 9,798,223 B2
(45) Date of Patent: Oct. 24, 2017

(54) PROJECTION IMAGE DISPLAY

(71) Applicant: MITSUBISHI ELECTRIC CORPORATION, Tokyo (JP)

(72) Inventors: Yuta Imanishi, Tokyo (JP); Akihiro Kitaguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/944,973

(22) Filed: Nov. 18, 2015

(65) Prior Publication Data

US 2016/0178994 A1    Jun. 23, 2016

(30) Foreign Application Priority Data

Dec. 17, 2014  (JP) ................................. 2014-254940

(51) Int. Cl.
| | |
|---|---|
| *G03B 21/14* | (2006.01) |
| *G03B 21/56* | (2006.01) |
| *G03B 21/10* | (2006.01) |
| *G03B 21/62* | (2014.01) |
| *G03B 21/58* | (2014.01) |
| *G02B 7/00* | (2006.01) |

(52) U.S. Cl.
CPC ........... *G03B 21/10* (2013.01); *G03B 21/145* (2013.01); *G03B 21/56* (2013.01); *G03B 21/562* (2013.01); *G03B 21/58* (2013.01); *G03B 21/62* (2013.01); *G02B 7/003* (2013.01)

(58) Field of Classification Search
CPC ............................... G03B 21/56; G03B 21/562
USPC ...... 359/449, 460, 461, 443; 353/79, 74, 77, 353/78
See application file for complete search history.

(56) References Cited

U.S. PATENT DOCUMENTS

| | | | | |
|---|---|---|---|---|
| 4,705,355 | A * | 11/1987 | Espo | ...................... G03B 21/58 359/443 |
| 5,160,951 | A * | 11/1992 | Lander | ................... G03B 21/10 353/119 |
| 7,365,806 | B2 | 4/2008 | Kitaguchi et al. | |
| 8,651,670 | B2 | 2/2014 | Kitaguchi | |
| 2005/0174497 | A1* | 8/2005 | Kitaguchi | ............... G03B 21/58 348/789 |
| 2010/0118282 | A1* | 5/2010 | Kitaguchi | ............ G03B 21/562 353/79 |
| 2011/0063580 | A1 | 3/2011 | Amano et al. | |

(Continued)

FOREIGN PATENT DOCUMENTS

| | | |
|---|---|---|
| CN | 1743944 A | 3/2006 |
| CN | 101772732 A | 7/2010 |

(Continued)

*Primary Examiner* — William C Dowling
(74) *Attorney, Agent, or Firm* — Birch, Stewart, Kolasch & Birch, LLP

(57) ABSTRACT

A projection image display includes: a screen unit that has a screen; a projection unit that projects an image onto the screen from a back surface of the screen; a housing that houses the projection unit; a slide mechanism that supports the screen unit such that the screen unit moves in an anterior-posterior direction; a locking mechanism that restricts a movement of the slide mechanism; and an adjustment mechanism that is capable of adjusting a position of the screen unit with respect to the housing from the outside while the locking mechanism restricts the movement of the slide mechanism.

7 Claims, 6 Drawing Sheets

(56) References Cited

U.S. PATENT DOCUMENTS

2011/0297810 A1    12/2011  Tachibana
2013/0100422 A1*   4/2013  Kitabayashi ........... G03B 21/10
                                                                353/79

FOREIGN PATENT DOCUMENTS

| | | |
|---|---|---|
| JP | 5279456 B2 | 9/2013 |
| JP | 2014-035713 A | 2/2014 |
| RU | 52493 U1 | 3/2006 |

* cited by examiner

F I G. 1 1
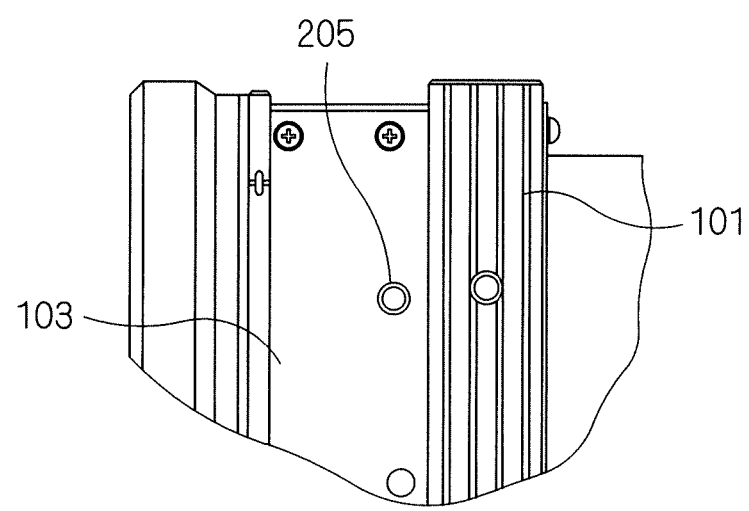

PROJECTION IMAGE DISPLAY

BACKGROUND OF THE INVENTION

Field of the Invention

The present invention relates to a projection image display that projects an image from the back and displays the image.

Description of the Background Art

Rear projection image displays have been known as projection image displays that project images onto a back surface of a screen from a projection unit. In a typical rear projection image display, a screen unit including a screen is removably attached, with screws, to a front surface of a housing from a back surface of the housing in which a projection unit is housed.

In recent years, space savings in installation of a projection image display allow a back surface of a housing to be closely installed on a wall, and the projection image display that allows all maintenance from a front surface of the housing has been developed. Thus, a simplification of the structures and a cost reduction are needed. For display on a large screen, a plurality of projection image displays are typically combined to be used.

The projection image display that allows maintenance from the front surface of the housing includes a projection image display capable of finely adjusting installation of a screen unit (for example, see Japanese Patent No. 5279456).

A device disclosed in Japanese Patent No. 5279456 includes a mechanism that is located inside the device and finely adjusts the position of the screen unit. A screen needs to be opened for the adjustment from the inside, which does not allow the adjustment while the screen unit is closely attached to a housing. To solve this problem, Japanese Patent No. 5279456 discloses a method of temporarily combining the adjustment mechanism with a driving mechanism that can be remotely controlled. However, after the adjustment, the screen unit needs to be opened and closed once, and the driving mechanism that can be remotely controlled needs to be taken out, so that the screen unit moves out of adjustment and needs predictive adjustments due to a need for the opening and closing.

In Japanese Patent No. 5279456, a hook projection formed as a locking means in a slide mechanism fits in a groove that can be fit with the hook projection and is formed in the screen unit, to thereby lock the screen unit. A likelihood of approximately 1 mm is provided to securely fit them together, but this likelihood results in looseness of the screen unit.

SUMMARY OF THE INVENTION

It is an object of the present invention to provide a projection image display capable of easily adjusting a position of a screen unit without a need to open and close the screen unit.

A projection image display according to the present invention includes: a screen unit that has a screen; a projection unit that projects an image onto the screen from a back surface of the screen; a housing that has a front surface on which the screen unit is located and that houses the projection unit; a slide mechanism that supports the screen unit such that the screen unit moves in an anterior-posterior direction with respect to the housing; a locking mechanism that restricts a movement of the slide mechanism; and an adjustment mechanism that is capable of adjusting a position of the screen unit with respect to the housing from the outside while the locking mechanism restricts the movement of the slide mechanism.

The projection image display includes the adjustment mechanism that is capable of adjusting the position of the screen unit with respect to the housing from the outside while the locking mechanism restricts the movement of the slide mechanism, so that the position of the screen unit can be easily adjusted without the need to open and close the screen unit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is an enlarged view of a B portion in FIG. 7.

DESCRIPTION OF THE PREFERRED EMBODIMENT

Preferred Embodiment

Figure 1:
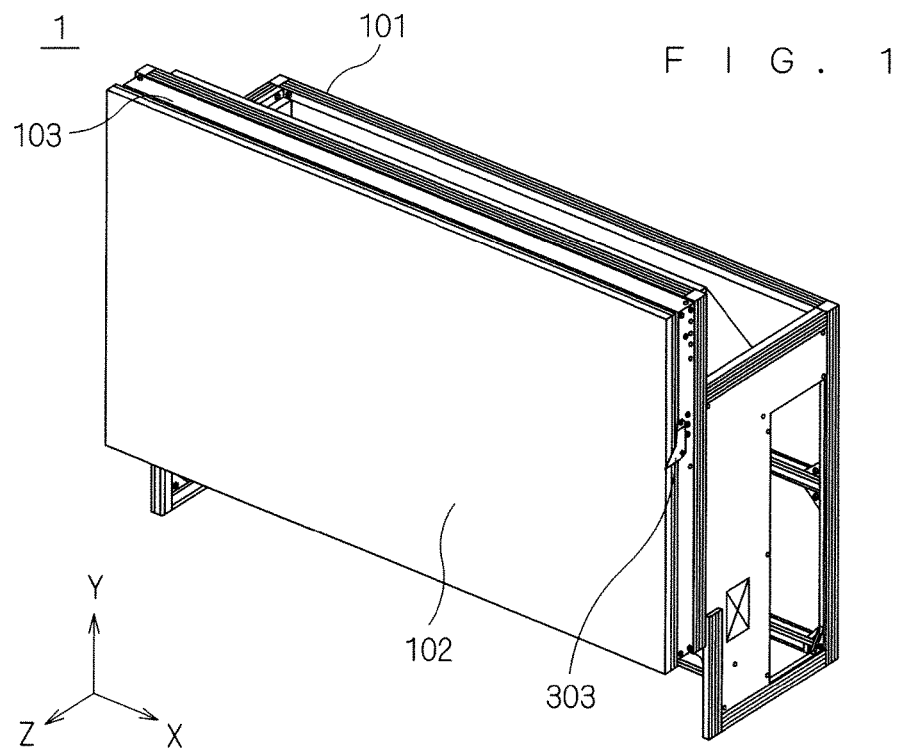
FIG. 1 is a perspective view of a projection image display according to a preferred embodiment.
Figure 2:
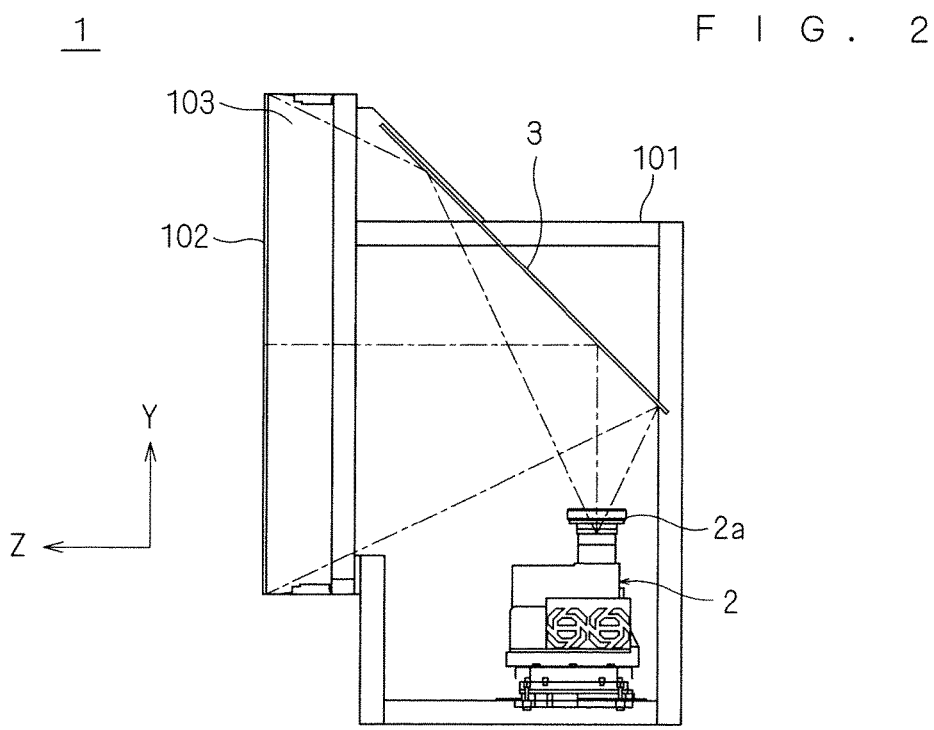
FIG. 2 is a cross-sectional view of the projection image display.

A preferred embodiment of the present invention is described below with reference to the drawings. FIG. 1 is a perspective view of a projection image display 1 according to the preferred embodiment. FIG. 2 is a cross-sectional view of the projection image display 1, and more specifically, a cross-sectional view of a midsection in a left-right direction of the projection image display 1 shown in FIG. 1.

Figure 8:
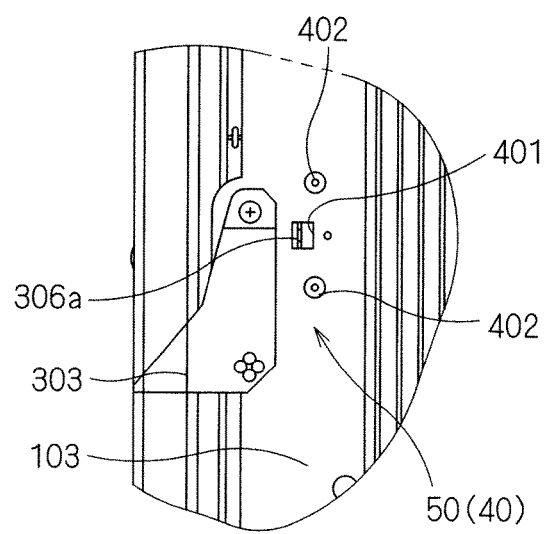
FIG. 8 is an enlarged view of a C portion in FIG. 7.
Figure 10:
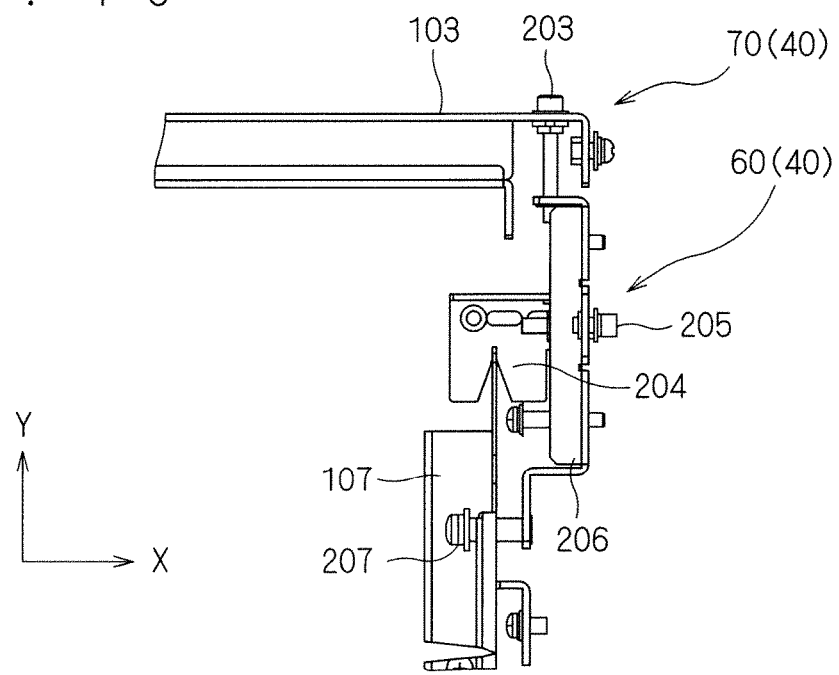
FIG. 10 is an arrow view of D in FIG. 9.

As shown in FIGS. 1 and 2, the projection image display 1 includes a screen unit 103 having a screen 102, a projection unit 2, a housing 101 in which the projection unit 2 is housed, a slide mechanism 10 (see FIG. 4), an alignment mechanism 20 (see FIG. 4), a locking mechanism 30 (see FIG. 6), and an adjustment mechanism 40 (see FIGS. 8 and 10). The projection unit 2 that projects an image onto the screen 102 from a back surface of the screen 102 via a projection lens 2a is located in a lower portion inside the housing 101. A mirror 3 is located above the projection unit 2, the mirror 3 reflecting emission light from the projection unit 2 to the screen 102. The mirror 3 is included in the typical projection image display, and thus descriptions of the mirror 3 are omitted from the following descriptions.

Here, in FIG. 1, a horizontal direction (left-right direction) of the screen unit 103 is an X direction, a vertical direction (up-down direction) of the screen unit 103 is a Y direction, and a normal direction (anterior-posterior direction) of the screen unit 103 is a Z direction. In this preferred embodiment, the projection image display 1 can be used singly, and a plurality of projection image displays arranged in the up-down direction and the left-right direction can be used as a multi-projection display.

Figure 3:
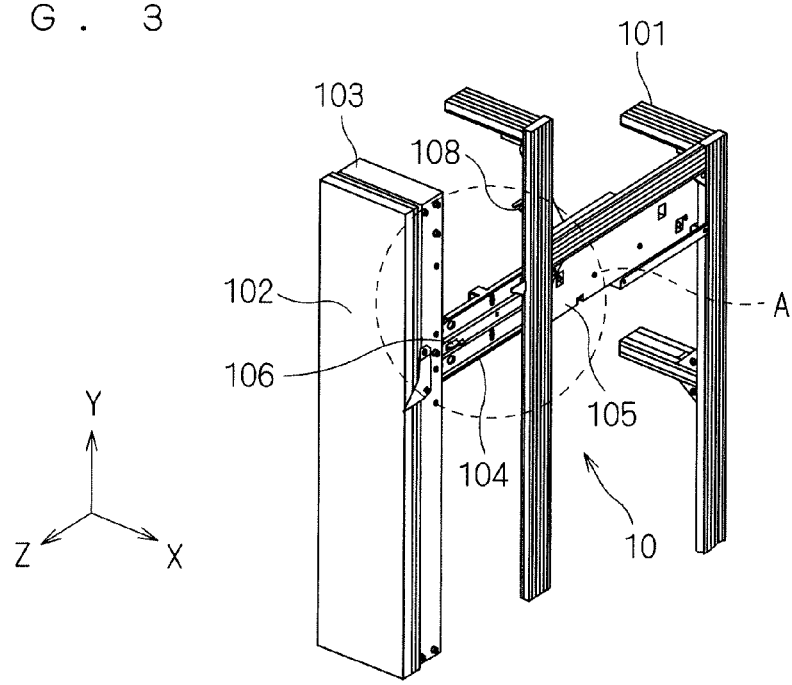
FIG. 3 is a perspective view showing a state in which a slide base protrudes from a housing.

Next, instructions for using the projection image display 1 are described. FIG. 3 is a perspective view showing a state in which a slide base 104 protrudes from the housing 101. As shown in FIG. 3, the screen unit 103 is configured so as to move in the anterior-posterior direction (Z direction) with respect to the housing 101, and the screen 102 can be replaced by sliding the screen unit 103 in the anterior direction (+Z direction) during maintenance. To remove the screen unit 103 from the projection image display 1, a user operates a handle 303 to release the locking state and to subsequently cause the screen unit 103 to protrude from the housing 101.

Next, the mechanisms of the projection image display 1 are each described. First, the slide mechanism 10 that supports the screen unit 103 such that the screen unit 103 moves in the anterior-posterior direction (Z direction) is described. As shown in FIG. 3, the slide mechanism 10 includes a base plate 105 and the slide base 104. The base plate 105 is formed so as to extend in the anterior-posterior direction (Z direction). The base plate 105 is located on the housing 101 and guides the slide base 104 in the anterior-posterior direction (Z direction) while holding the slide base 104. The slide base 104 includes a slide rail 106 that moves in the anterior-posterior direction (Z direction) along a rail portion located in the base plate 105. The slide mechanism 10 is located on each of the right and left side portions of the housing 101, and the screen unit 103 can thus move in the anterior-posterior direction (Z direction).

Figure 4:
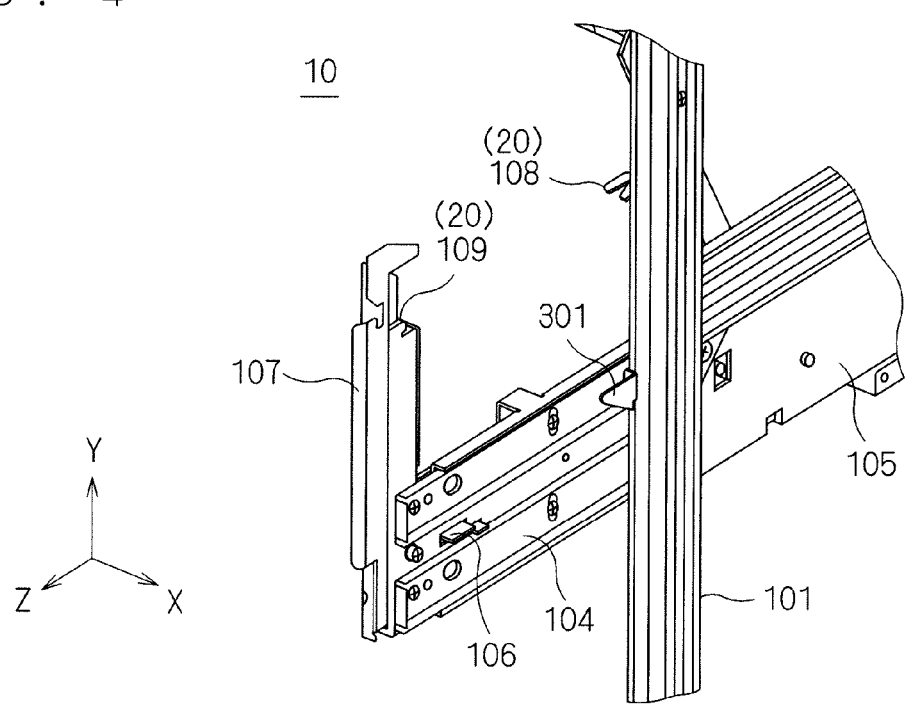
FIG. 4 is an enlarged view of an A portion in FIG. 3.

Next, the alignment mechanism 20 that aligns the screen unit 103 and the housing 101 is described. FIG. 4 is an enlarged view of an A portion in FIG. 3 and is the view in which the screen unit 103 is removed. As shown in FIG. 4, the alignment mechanism 20 includes a projection 109 (locking portion) and a V-shaped groove 108 (locking groove). The projection 109 protrudes in the posterior direction (-Z direction) from a plate 107 attached to the slide base 104. The V-shaped groove 108 has an opening in the anterior direction (+Z direction) on the base plate 105 and is lockable with the projection 109.

The projection 109 on the plate 107 attached to the slide base 104 locks with the V-shaped groove 108 located on the base plate 105, and the slide base 104 is housed in the base plate 105, so that the slide base 104 is housed in a predetermined position in the housing 101 in a case where the screen unit 103 is misaligned in the left-right direction (X direction). This can fix the screen unit 103 accurately aligned in a predetermined position.

Figure 5:
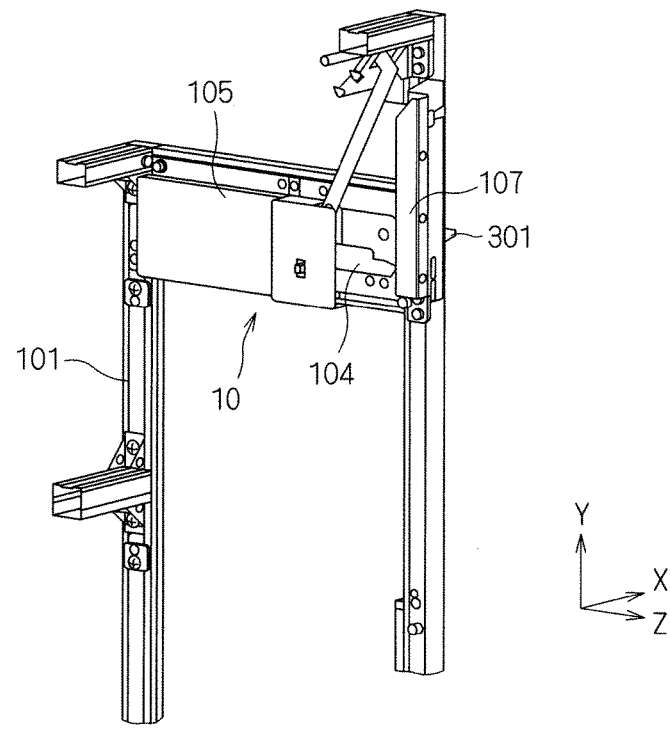
FIG. 5 is a perspective view, seen from the inside, showing a state in which the slide base is housed in the housing.

FIG. 5 is a perspective view, seen from the inside (-X direction), showing the state in which the slide base 104 is housed in the housing 101. As shown in FIG. 5, when the slide base 104 moves in the posterior direction (-Z direction) of the housing 101, the slide base 104 is housed in the housing 101 (more specifically, the base plate 105).

Figure 6:
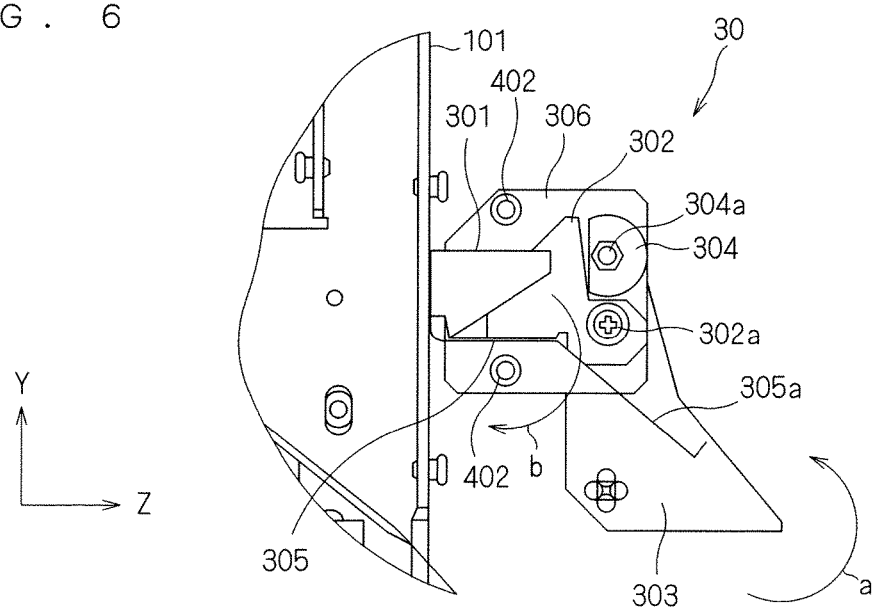
FIG. 6 is a rear view of a locking mechanism.

Next, the locking mechanism 30 that restricts a movement of the slide mechanism 10 is described. FIG. 6 is a rear view of the locking mechanism 30 (seen from -X direction) and is the view in which the screen unit 103 is removed. As shown in FIG. 6, the locking mechanism 30 includes a locking plate 306, a plate spring 305 (elastic member), and a hook 301. The locking mechanism 30 further includes the handle 303 and a D-shaped support plate 304.

The handle 303 is attached to the side portion of the screen unit 103 via the locking plate 306. The D-shaped support plate 304 supports the handle 303 rotatably about a support shaft 304a. A locking piece 302 is supported rotatably about a support shaft 302a and is attached to the screen unit 103 via the locking plate 306 while contacting an outer peripheral portion of the D-shaped support plate 304. Consequently, when the handle 303 rotationally moves in a direction of an arrow a (counterclockwise direction in FIG. 6), the locking piece 302 rotationally moves in the direction of the arrow a.

The plate spring 305 is rotatably attached to the locking plate 306 while contacting an outer peripheral portion of the locking piece 302. When the handle 303 rotationally moves in the direction of the arrow a to cause the locking piece 302 to rotationally move in the direction of the arrow a, the plate spring 305 attached to the locking plate 306 rotationally moves in a direction of an arrow b (clockwise direction in FIG. 6). This causes the plate spring 305 to lock with the hook 301 attached to the housing 101, to thereby restrict the movement of the screen unit 103.

On the other hand, when the handle 303 rotationally moves in the direction opposite to the arrow a, the plate spring 305 rotationally moves in the direction opposite to the arrow b by the urging force of the plate spring 305, thereby releasing the locking state (restriction) of the plate spring 305 and the hook 301. A spring member 305a has one end attached to the plate spring 305 and the other end attached to the handle 303, so that the handle 303 returns to the position shown in FIG. 6 by the urging force of the spring member 305a.

Next, the adjustment mechanism 40 is described. The adjustment mechanism 40 adjusts a position of the screen unit 103 with respect to the housing 101 from the outside while the locking mechanism 30 restricts the movement of the slide mechanism 10. The adjustment mechanism 40 includes a locking position adjustment mechanism 50 being an anterior-posterior direction (Z direction) adjustment mechanism, a left-right direction (X direction) adjustment mechanism 60, and an up-down direction (Y direction) adjustment mechanism 70.

First, the locking position adjustment mechanism 50 that adjusts the screen unit 103 in the anterior-posterior direction (Z direction) with respect to the housing 101 is described. As shown in FIG. 6, the locking plate 306 moves in the anterior direction (+Z direction) while the movement of the slide mechanism 10 is restricted, so that the position of the screen unit 103 can be adjusted in the anterior direction (+Z direction).

Conventional screen units in a state of being housed are not finely adjustable in the anterior-posterior direction (Z direction), and thus such screen unit fails to be completely attached to a housing, resulting in looseness of the screen unit. Consequently, when each projection image display is installed, a position of the screen unit in the anterior-posterior direction (Z direction) has an error with respect to the housing. Therefore, when a plurality of projection image displays are installed to form a multivision system, screen surfaces of the projection image displays are not aligned in the anterior-posterior direction (Z direction).

In contrast, the projection image display 1 in this preferred embodiment can finely adjust the screen unit 103 and eliminate looseness thereof, so that adjustability of the installation of the projection image display 1 for configuring the multivision system can be increased.

Figure 7:
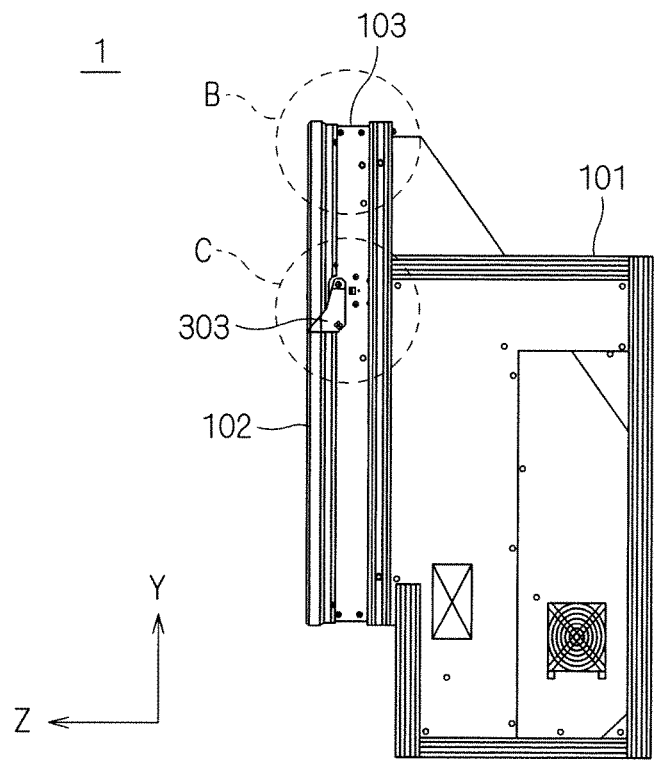
FIG. 7 is a side view of the projection image display.

FIG. 7 is a side view of the projection image display 1, and FIG. 8 is an enlarged view of a C portion in FIG. 7. The locking position adjustment mechanism 50 adjusts positions of the hook 301 and the plate spring 305 in the anterior-posterior direction (Z direction) by moving the locking plate 306 in the anterior-posterior direction (Z direction) from the outside. The locking position adjustment mechanism 50 includes a hole portion 401 and a catch portion 306a. The hole portion 401 is located in the lateral surface of the screen unit 103. The locking plate 306 includes the catch portion 306a that fits in the hole portion 401 from the inside.

The catch portion 306a is exposed from the hole portion 401. The locking plate 306 is fixed on the side portion of the screen unit 103 with screws 402 while the catch portion 306a fits in the hole portion 401. The locking plate 306 is attached to the screen unit 103 with play such that the locking plate 306 moves in the anterior-posterior direction (Z direction). More specifically, the hole portion 401 has a length in the anterior-posterior direction (Z direction) longer than a length of the catch portion 306a in the anterior-posterior direction (Z direction), and the catch portion 306a is movable in the anterior-posterior direction (Z direction) along the hole portion 401. Moreover, a screw hole (not shown) formed in the side portion of the screen unit 103 has a length in the anterior-posterior direction (Z direction) longer than an outer diameter of the screw 402, so that the locking plate 306 is movable in the anterior-posterior direction (Z direction) with the screws 402 that are inserted into the screen unit 103.

When the locking mechanism 30 shown in FIG. 6 restricts the movement of the slide mechanism 10, the hook 301 and the plate spring 305 have a gap therebetween. The gap results in looseness of the screen unit 103. The catch portion 306a is moved from the outside to adjust the position of the locking plate 306 in the anterior-posterior direction (Z direction), so that the positions of the hook 301 and the plate spring 305 in the anterior-posterior direction (Z direction) can be adjusted by. This can fix the hook 301 and the plate spring 305 without a gap while the screen unit 103 is closely attached to the housing 101.

Figure 9:
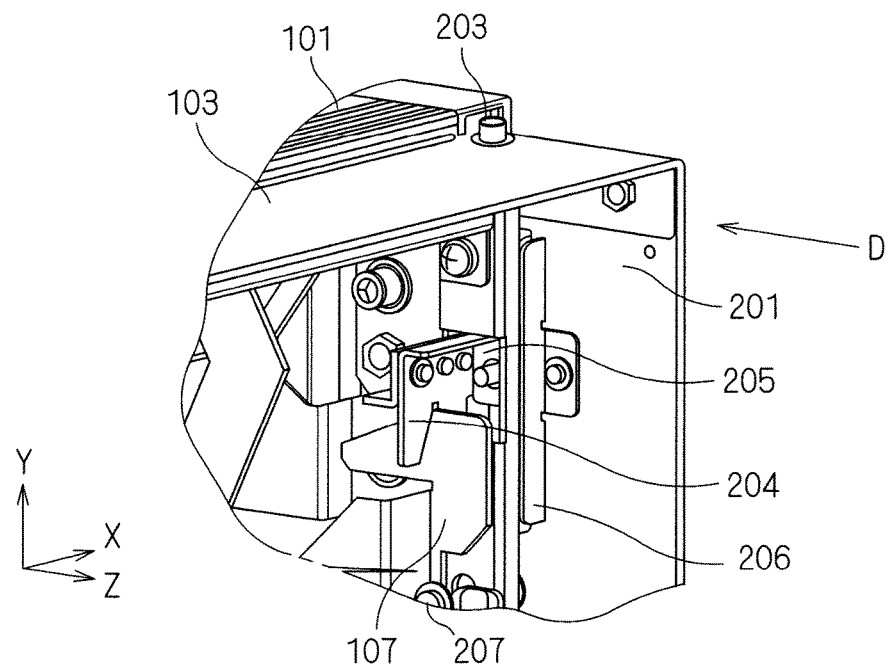
FIG. 9 is a perspective view, seen from the inside, showing an upper right corner portion of the screen unit.

Next, the adjustment mechanism 60 that adjusts the screen unit 103 in the left-right direction (X direction) with respect to the housing 101 is described. FIG. 9 is a perspective view, seen from the inside, showing an upper right corner portion of the screen unit 103, and is the view in which the screen 102 is removed. The adjustment mechanism 60 includes a plate 204 (first plate) and a screw 205 (first screw). The plate 204 is located on each of the right and left side portions of the screen unit 103. The screw 205 fixes the plate 204 to the screen unit 103 from the lateral surface side of the screen unit 103. Adjusting (Rotationally moving) the screw 205 causes the screen unit 103 to move in the left-right direction (X direction) with respect to the housing 101 via the plate 204. The movement of the screen unit 103 in the left-right direction (X direction) is described in detail. Rotationally moving the screw 205 from the outside of the screen unit 103 causes the plate 204 to move individually in the left-right direction (X direction). A plate 107 fits in the plate 204, to thereby determine the position of the screen unit 103. The plate 107 is attached to the housing 101 side, so that rotationally moving the screw 205 allows the screen unit 103 to move in the left-right direction (X direction). In other words, adjusting (rotationally moving) the screw 205 can adjust the position of the screen unit 103 in the left-right direction (X direction) with respect to the housing 101.

Next, the adjustment mechanism 70 that adjusts the screen unit 103 in the up-down direction (Y direction) with respect to the housing 101 is described. FIG. 10 is an arrow view of D in FIG. 9 and is the view in which a side-surface plate 201 and the housing 101 are removed. As shown in FIGS. 9 and 10, the adjustment mechanism 70 is located on each of the right and left side portions of the screen unit 103, and the adjustment mechanism 70 includes a plate 206 (second plate), the plate 107 (third plate), and a screw 203 (second screw).

The plate 107 is hooked by a shaft 207 and fixed. The shaft 207 is connected to a lower portion of the plate 206. The screw 203 is fixed in an upper portion of the plate 206. Adjusting (Rotationally moving) the screw 203 causes the plate 206 to move in the up-down direction (Y direction). Moving the plate 206 in the up-down direction (Y direction) and moving the shaft 207 cause the plate 107 to move in the up-down direction (Y direction). Moving the plate 107 in the up-down direction (Y direction) causes the screen unit 103 to move in the up-down direction (Y direction) with respect to the housing 101. In other words, the position of the screen unit 103 in the up-down direction (Y direction) with respect to the housing 101 can be adjusted. The adjustment mechanism 70 is located on each of the right and left sides of the screen unit 103, so that the screen unit 103 can also be adjusted in a rotational direction. In addition, the plate 206 and the plate 107 correspond to adjustment members.

FIG. 11 is an enlarged view of a B portion in FIG. 7. Adjusting (Rotationally moving) the screw 205 can adjust the screen unit 103 in the left-right direction (X direction) from the outside while the screen unit 103 is closely attached to the housing 101, as described in FIG. 9. Further, adjusting (rotationally moving) the screw 203 can adjust the screen unit 103 in the up-down direction (Y direction) from the outside while the screen unit 103 is closely attached to the housing 101.

As described above, the projection image display 1 in this preferred embodiment includes the adjustment mechanism 40 that is capable of adjusting the position of the screen unit 103 with respect to the housing 101 from the outside while the locking mechanism 30 restricts the movement of the slide mechanism 10, so that the position of the screen unit 103 can be easily adjusted without a need to open and close the screen unit 103.

The locking mechanism 30 includes the hook 301 located on the housing 101, the plate spring 305 lockable with the hook 301, and the locking plate 306 on which the plate spring 305 is located, the locking plate 306 being attached to the screen unit 103 with play such that the locking plate 306 moves in the anterior-posterior direction. The adjustment mechanism 40 includes the locking position adjustment mechanism 50 that adjusts a locking position of the locking mechanism 30. The locking position adjustment mechanism 50 adjusts the positions of the hook 301 and the plate spring 305 in the anterior-posterior direction (Z direction) by moving the locking plate 306 in the anterior-posterior direction (Z direction) from the outside.

Therefore, the looseness of the screen unit 103 can be suppressed, and the position of the screen 102 in the anterior-posterior direction (Z direction) can be adjusted. This increases adjustability of installation when the screen unit 103 is installed as a multi-projection display.

The locking position adjustment mechanism 50 includes the hole portion 401 located in the screen unit 103 and the catch portion 306a that is located on the locking plate 306, is exposed to the outside from the hole portion 401, and is movable in the anterior-posterior direction (Z direction). Moving the catch portion 306a in the anterior-posterior direction (Z direction) from the outside causes the locking plate 306 to move in the anterior-posterior direction (Z direction).

Therefore, the locking position adjustment mechanism 50 having the simple configuration can be achieved, and manufacturing costs of the projection image display 1 can be suppressed.

The adjustment mechanism 40 includes the left-right direction (X direction) adjustment mechanism 60. The adjustment mechanism 60 includes the plate 204 located on the screen unit 103 and the screw 205 fixing the plate 204 to the screen unit 103 from the lateral surface side of the screen unit 103. The adjustment mechanism 60 causes the screen unit 103 to move in the left-right direction (X direction) with respect to the housing 101 via the plate 204 by rotationally moving the screw 205 from the outside.

Therefore, while the screen unit 103 is closed, rotationally moving the screw 205 from the outside to move the plate 204 can cause the screen unit 103 to move in the left-right direction (X direction). Thus, the position of the screen unit 103 in the left-right direction (X direction) can be adjusted. Consequently, adjustability of installation is increased when the screen unit 103 is installed as the multi-projection display. The adjustment mechanism 60 having the simple configuration can be achieved, and the manufacturing costs of the projection image display 1 can be suppressed.

The adjustment mechanism 40 includes the up-down direction (Y direction) adjustment mechanism 70. The adjustment mechanism 70 includes the adjustment members located in the screen unit 103 and the screw 203 fixing the adjustment members to the screen unit 103 from the upper surface side of the screen unit 103. The adjustment mechanism 40 causes the screen unit 103 to move in the up-down direction (Y direction) with respect to the housing 101 via the adjustment members by rotationally moving the screw 203 from the outside.

Therefore, while the screen unit 103 is closed, rotationally moving the screw 203 from the outside to move the adjustment members can cause the screen unit 103 to move in the up-down direction (Y direction). Thus, the position of the screen unit 103 in the up-down direction (Y direction) can be adjusted. Consequently, adjustability of installation is increased when the screen unit 103 is installed as the multi-projection display.

The adjustment members include the plate 206 fixed with the screw 203 and the plate 107 connected to the plate 206, so that the adjustment mechanism 70 having the simple configuration can be achieved, and the manufacturing costs of the projection image display 1 can be suppressed.

The projection image display 1 further includes the alignment mechanism 20 that aligns the screen unit 103 and the housing 101. The slide mechanism 10 includes the base plate 105 located on the housing 101 and the slide base 104 that is located on the screen unit 103 and moves along the base plate 105. The alignment mechanism 20 includes the projection 109 located on the slide base 104 and the V-shaped groove 108 that is located on the base plate 105 and is lockable with the projection 109.

Therefore, in a case where the screen unit 103 is misaligned in the left-right direction (X direction), the slide rail 106 moves along the rail portion in the base plate 105 to house the screen unit 103, so that the screen unit 103 can be easily aligned. Consequently, the screen unit 103 can be easily opened and closed.

As described above, the position of the screen unit 103 in the anterior-posterior direction (Z direction), the left-right direction (X direction), and the up-down direction (Y direction) can be adjusted from the outside without the need to open and close the screen unit 103. To configure a multivision system, conventional screen units are opened and closed, and the position of such screen unit in the anterior-posterior direction is repeatedly adjusted by predictive adjustments after a projection image display is installed. In contrast, the projection image display 1 in this preferred embodiment can adjust the screen unit 103 in the anterior-posterior direction (Z direction), the left-right direction (X direction), and the up-down direction (Y direction) from the outside while the screen unit 103 is housed. This eliminates the need to open and close the screen unit 103 and repeat the predictive adjustments, so that the position of the screen unit 103 can be easily adjusted at the time of installation, and time for adjusting the installation when the multivision system is configured can be shortened.

In addition, according to the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A projection image display, comprising:
    a screen unit that has a screen;
    a projection unit that projects an image onto said screen from a back surface of said screen;
    a housing that has a front surface on which said screen unit is located and that houses said projection unit;
    a slide mechanism that supports said screen unit such that said screen unit moves in an anterior-posterior direction with respect to said housing;
    a locking mechanism that restricts a movement of said slide mechanism; and
    an adjustment mechanism that is capable of adjusting a position of said screen unit with respect to said housing from the outside while said locking mechanism restricts the movement of said slide mechanism, said adjustment mechanism adjusting a position of at least said locking mechanism when adjusting said position of said screen unit.

2. The projection image display according to claim 1, wherein
    said locking mechanism includes a hook located on said housing, an elastic member lockable with said hook, and a locking plate on which said elastic member is located, said locking plate being attached to said screen unit with play such that said locking plate moves in the anterior-posterior direction,
    said adjustment mechanism includes a locking position adjustment mechanism that adjusts a locking position of said locking mechanism, and
    said locking position adjustment mechanism adjusts positions of said hook and said elastic member in the anterior-posterior direction by moving said locking plate in the anterior-posterior direction from the outside.

3. The projection image display according to claim 2, wherein
    said locking position adjustment mechanism includes a hole portion located in said screen unit and a catch portion that is located on said locking plate, is exposed to the outside from said hole portion, and is movable in the anterior-posterior direction, and
    moving said catch portion in the anterior-posterior direction from the outside causes said locking plate to move in the anterior-posterior direction.

4. A projection image display, comprising:
a screen unit that has a screen;
a projection unit that projects an image onto said screen from a back surface of said screen;
a housing that has a front surface on which said screen unit is located and that houses said projection unit;
a slide mechanism that supports said screen unit such that said screen unit moves in an anterior-posterior direction with respect to said housing;
a locking mechanism that restricts a movement of said slide mechanism; and
an adjustment mechanism that is capable of adjusting a position of said screen unit with respect to said housing from the outside while said locking mechanism restricts the movement of said slide mechanism, wherein
said adjustment mechanism includes a left-right direction adjustment mechanism,
said left-and-light direction adjustment mechanism includes a first plate located on said screen unit and a first screw fixing said first plate to said screen unit from a lateral surface side of said screen unit, and
said left-right direction adjustment mechanism causes said screen unit to move in a left-right direction with respect to said housing via said first plate by rotationally moving said first screw from the outside.

5. A projection image display, comprising
a screen unit that has a screen;
a projection unit that projects an image onto said screen from a back surface of said screen;
a housing that has a front surface on which said screen unit is located and that houses said projection unit;
a slide mechanism that supports said screen unit such that said screen unit moves in an anterior-posterior direction with respect to said housing;
a locking mechanism that restricts a movement of said slide mechanism; and
an adjustment mechanism that is capable of adjusting a position of said screen unit with respect to said housing from the outside while said locking mechanism restricts the movement of said slide mechanism, wherein
said adjustment mechanism includes an up-down direction adjustment mechanism,
said up-down direction adjustment mechanism includes an adjustment member located in said screen unit and a second screw fixing said adjustment member to said screen unit from an upper surface side of said screen unit, and
said up-down direction adjustment mechanism causes said screen unit to move in an up-down direction with respect to said housing via said adjustment member by rotationally moving said second screw from the outside.

6. The projection image display according to claim 5, wherein said adjustment member includes a second plate fixed with said second screw and a third plate connected to said second plate.

7. The projection image display according to claim 1, further comprising an alignment mechanism that aligns said screen unit and said housing, wherein
said slide mechanism includes a base plate located on said housing and a slide base that is located on said screen unit and moves along said base plate, and
said alignment mechanism includes a locking portion located on said slide base and a locking groove that is located on said base plate and is lockable with said locking portion.

* * * * *